(12) United States Patent
Teulou et al.

(10) Patent No.: US 8,720,818 B1
(45) Date of Patent: May 13, 2014

(54) THRUST REVERSER AND NACELLE FOR AIRCRAFT EQUIPPED WITH AT LEAST ONE SUCH REVERSER

(75) Inventors: Olivier Teulou, Buzet sur Tarn (FR); Guillaume Poirier, Semussac (FR)

(73) Assignee: Airbus Operations SAS, Toulouse (FR)

( * ) Notice: Subject to any disclaimer, the term of this patent is extended or adjusted under 35 U.S.C. 154(b) by 1368 days.

(21) Appl. No.: 12/551,687

(22) Filed: Sep. 1, 2009

(30) Foreign Application Priority Data

Sep. 2, 2008 (FR) ..................... 08 04816

(51) Int. Cl.
*F02K 1/54* (2006.01)
(52) U.S. Cl.
USPC .................. 244/110 B; 60/226.2; 239/265.23
(58) Field of Classification Search
USPC .................. 244/110 B, 53 B, 53 R; 60/226.2; 239/265.23
See application file for complete search history.

(56) References Cited

U.S. PATENT DOCUMENTS

| | | | | |
|---|---|---|---|---|
| 2,618,391 | A * | 11/1952 | Hastings | 211/99 |
| 3,815,357 | A | 6/1974 | Brennan | |
| 5,987,880 | A * | 11/1999 | Culbertson | 60/204 |
| 6,438,942 | B2 * | 8/2002 | Fournier et al. | 60/226.2 |
| 6,487,845 | B1 * | 12/2002 | Modglin et al. | 60/226.2 |
| 6,895,742 | B2 * | 5/2005 | Lair et al. | 60/226.2 |
| 7,874,142 | B2 * | 1/2011 | Beardsley | 60/226.2 |
| 8,162,257 | B2 * | 4/2012 | Teulou | 244/110 B |
| 8,201,390 | B2 * | 6/2012 | Sternberger | 60/226.2 |
| 2007/0007388 | A1 * | 1/2007 | Harrison et al. | 244/110 B |

FOREIGN PATENT DOCUMENTS

| | | |
|---|---|---|
| EP | 0893597 A | 1/1999 |
| FR | 2887225 A | 12/2006 |
| RU | 2044912 C1 | 9/1995 |

OTHER PUBLICATIONS

French search report dated Feb. 11, 2009.

* cited by examiner

*Primary Examiner* — Christopher P Ellis
(74) *Attorney, Agent, or Firm* — Dickinson Wright PLLC

(57) ABSTRACT

A thrust reverser for a double-flow nacelle that has a cowling, with the thrust reverser having an internal door and an external door designed to be made within the thickness of the cowling. The reverser also has means for simultaneously displacing the doors between a first position called the rest position, in which the doors are integrated into the cowling so as to form an aerodynamic continuity with the external wall and the internal wall of the cowling, and a second active position, in which the doors are open so that the internal and external doors extend toward the inside and toward the outside of the nacelle, respectively, thus at least partially blocking the annular channel of the secondary flow, to deflect the secondary flow and to generate a thrust reversal, with the means being designed to be received in a compartment arranged inside the cowling formed by the doors in the rest position.

10 Claims, 4 Drawing Sheets

THRUST REVERSER AND NACELLE FOR AIRCRAFT EQUIPPED WITH AT LEAST ONE SUCH REVERSER

CROSS-REFERENCE TO RELATED APPLICATIONS

This application claims priority to and the benefit of French Application No. 08 55880, filed Sep. 2, 2008, which is incorporated herein by reference in its entirety.

BACKGROUND

The disclosed embodiments relate to a thrust reverser to form a reverse flow from a secondary thrust flow in a double-flow nacelle. The disclosed embodiments also relate to a nacelle for a double-flow engine equipped with such a reverser for aircraft.

In general, the nacelle has a cowling in which there is an engine. Air is drawn into the nacelle at a front extremity of said nacelle, located at the forward part of the aircraft. The nacelle ejects the absorbed air at high velocity toward the rear of the aircraft. To permit forward motion of the aircraft, it is necessary for the air mass passing through the nacelle to have a discharge velocity higher than the intake velocity. The discharge velocity of the air mass is increased by a known method inside the nacelle.

The air passing through the nacelle is composed of two different flows. A first flow, called the primary flow, passes through the engine. The primary flow is ejected directly out of the nacelle from the rear of the engine. A second flow, called the secondary flow, passes through an air passage channel before being ejected out of the nacelle. This air passage channel is an annular channel formed between an inside wall of the nacelle cowling and an outside wall of the engine, and extends along said engine.

When the aircraft lands, mechanical brakes provide for mechanical braking of said aircraft. However, once the aircraft is on the ground it is known how to utilize thrust reversers in addition to the mechanical brakes. The thrust reversers in particular favor reducing the landing distance of the aircraft. The landing distance of the aircraft means the distance traveled by the aircraft between the moment the landing gear of the aircraft touches the runway and the moment when the aircraft has completely stopped on the runway. The thrust reversers deflect all or part of the air flow ejected from the rear of the nacelle and eject it toward the front of the aircraft. The reversers thus create an aerodynamic drag and accordingly a braking force called the "counterthrust," which contributes to the slowing of the aircraft.

Thrust reversers with two pivoting doors made in the thickness of the nacelle cowling are known as thrust reversers. The doors are distributed over an outer circumference of the nacelle cowling. The number of reversers may vary, depending on the particular applications, and according to the method of mounting the propulsion apparatus assembly on the aircraft. In the inactive position the doors are closed, in other words they extend in an extension of the cowling. In the active position, the doors are open. A displacement of the doors is such that parts of the doors then extend toward the outside of the nacelle in a direction essentially perpendicular to a longitudinal axis of the nacelle. Generally speaking, each of the two doors has a free extremity and a pivoting extremity. By a free extremity is meant the extremity of the door that describes motion in an arc when the door is displaced from the closed position to the open position. By a pivoting extremity is meant the extremity of the door on which the pivoting axis is positioned. Thus, when the doors are open, the free extremity of one of the two doors extends toward the interior of the nacelle, thus at least partially blocking the air passage channel. The flow of air is then blocked, and is evacuated to outside the nacelle by an opening made by opening the second door toward the outside of the nacelle, which deflects the flow of air toward the front of the nacelle so as to produce a thrust reversal.

The document FR 2 887 225 discloses a nacelle equipped with thrust reversers. Each thrust reverser is equipped with an internal door and an external door, with each of these doors having a unique direction of displacement. These two directions of displacement are opposed, so that when the thrust reverser is in the active position, the external door sends the air flow blocked by the internal door inside the nacelle, toward the front of the nacelle. Locking mechanisms are provided to guarantee that no untimely opening of the doors can occur while the aircraft is in flight.

One of the problems of the known reversers is the complexity of the movable elements that constitute the door displacement apparatus, so that there is a risk of more frequent failure. Furthermore, these movable elements are arranged relative to the door in such a manner that a portion of these elements is situated outside the cowling of the nacelle, inducing aerodynamic perturbations at the nacelle.

The thrust reversers with pivoting doors are also questionable in principle since they can be opened in an untimely manner. Actually, the secondary flow passes under pressure into the air passage made between the inside wall of the cowling and the outside wall of the engine. Also, the secondary flow exerts pressure against the inside wall of the cowling and accordingly also on the doors. Since the displacement of the doors is directed toward the outside of the nacelle, the force exerted by the flow of air against the inside wall of the cowling favors the opening of the doors. The risk of untimely opening is all the greater when the control mechanism fails. A locking apparatus is generally proposed to block the doors while the airplane is in flight. However, such an apparatus does not guarantee for certain the closing of the doors; actually it can also become inoperative itself during flight, and this supplementary apparatus also causes an increase in the cost of manufacture and also in the weight of the nacelle equipped with such a reverser.

In general, the currently proposed thrust reversers are associated with burdensome maintenance and design constraints linked to the risk of untimely opening in flight.

SUMMARY

The disclosed embodiments attempt to resolve the problems exposed above by producing a thrust reverser that is simple in design and in its mode of operation.

The purpose of the disclosed embodiments is accordingly to propose a new thrust reverser with doors to deflect the secondary flow to as to produce a thrust reversal that is simple in structural terms and in kinematic terms to minimize its weight and its manufacturing cost, while providing for complete integration in the nacelle cowling, thus providing for suppression of the aerodynamic perturbations that may be introduced by their presence.

Another purpose of the embodiments disclosed herein is to propose thrust reversers whose inactive position is a stable position, with the doors remaining closed or closing automatically when the control mechanism of the doors fails, in order not to generate any risk of untimely opening when the airplane is in flight.

To this end, the presently disclosed embodiments relate to a thrust reverser for a double-flow nacelle that has a cowling, said thrust reverser comprising an internal door and an external door intended to be produced within the thickness of said cowling, and means for simultaneously displacing said doors between a first position called the rest position, in which said doors are integrated in said cowling to form an aerodynamic continuity with the outside wall and the inside wall of said cowling, and a second active position in which said doors are open so that said internal and external doors extend toward the inside and toward the outside, respectively, of the nacelle, thus at least partially blocking the annular secondary flow channel, to deflect the secondary flow and produce a thrust reversal.

According to one or more embodiments, said means of displacement of said doors comprise means for sliding along a shaft essentially parallel to the principal axis of the nacelle, with the extremities of said means being designed to be linked in a pivoting manner to one extremity of said doors, each of the doors being also linked to said shaft through at least two intermediate pivoting arms whose extremities are hinged respectively to the door and to the shaft, so that the sliding of said means along said shaft entails the displacement of the doors between the two positions, and said displacement means are arranged relative to the doors so that they are designed to be received in a compartment produced in said cowling formed by the doors in the rest position.

According to at least one embodiment, the external and internal doors have such dimensions that the forces generated by the pressure P1 of the external flow applied to a surface $S_{1A}$ of the external door and by the pressure P2 of the secondary flow applied to a surface $S_{2A}$ of the internal door lead to exertion of forces on the doors in a direction tending to keep the doors in the stable inactive position, said surfaces $S_{1A}$ and $S_{2A}$ being delimited respectively by the free extremity of the external and internal doors, and the pivot linkage of said doors with the extremity of the arms.

This particularly advantageous configuration confers very stable positions on the doors. Thus, by way of illustration, in case the means of displacement fail, the external and internal doors are no longer able to be kept permanently in the closed position by the means of displacement. When the doors tend to open under the force exerted by the secondary flow and the external flow at the nacelle, because of the system disclosed herein, the doors are automatically returned to the closed position under the action of the forces generated by the pressure applied to the doors only.

According to an embodiment, said means of sliding comprise a reversible ball nut held on an endless screw, said nut being intended to be moved longitudinally along said screw between a position on the upstream side of said screw, in which the doors are in the rest position, and a position on the downstream side of said screw, in which the doors are in the open position, with the extremities of said nut being linked to pivot at the same time on the extremity of the external door and on the extremity of the internal door.

In a general way and in the rest of the description, the upstream and downstream positions are defined relative to the normal direction of circulation of the gases with direct thrust.

According to an embodiment, said pivoting arms are hinged connecting rods.

According to an embodiment, the screw has a first extremity linked to a structural element of the nacelle located on the downstream side of said nacelle, and a second extremity linked to another structural element of the nacelle located on the upstream side of said nacelle.

According to an embodiment, the reverser also has a motor designed to displace said nut along the screw.

At least one embodiment also relates to a nacelle for a double-flow engine comprising a cowling, an engine mounted in an internal volume of the cowling, and an annular flow channel for a secondary flow provided between the engine and the cowling, said nacelle being equipped with at least one thrust reverser such as that described above to form a reverse flow from said secondary flow.

According to an embodiment, said thrust reversers are provided in said cowing arranged around an external circumference of said cowling.

In a particular example of an embodiment, the nacelle comprises four groups of three thrust reversers arranged on the external circumference, said groups being diametrically opposite one another, two for two.

Finally, an aircraft equipped with at least one nacelle is also the subject matter of the disclosed embodiments.

BRIEF DESCRIPTION OF THE DRAWINGS

The aspects of the disclosed embodiments will be better understood by reading the following description and examining the Figures that accompany it. They are shown by way of example and do not limit the disclosed embodiments in any way. The Figures show.

DETAILED DESCRIPTION

Figure 1:
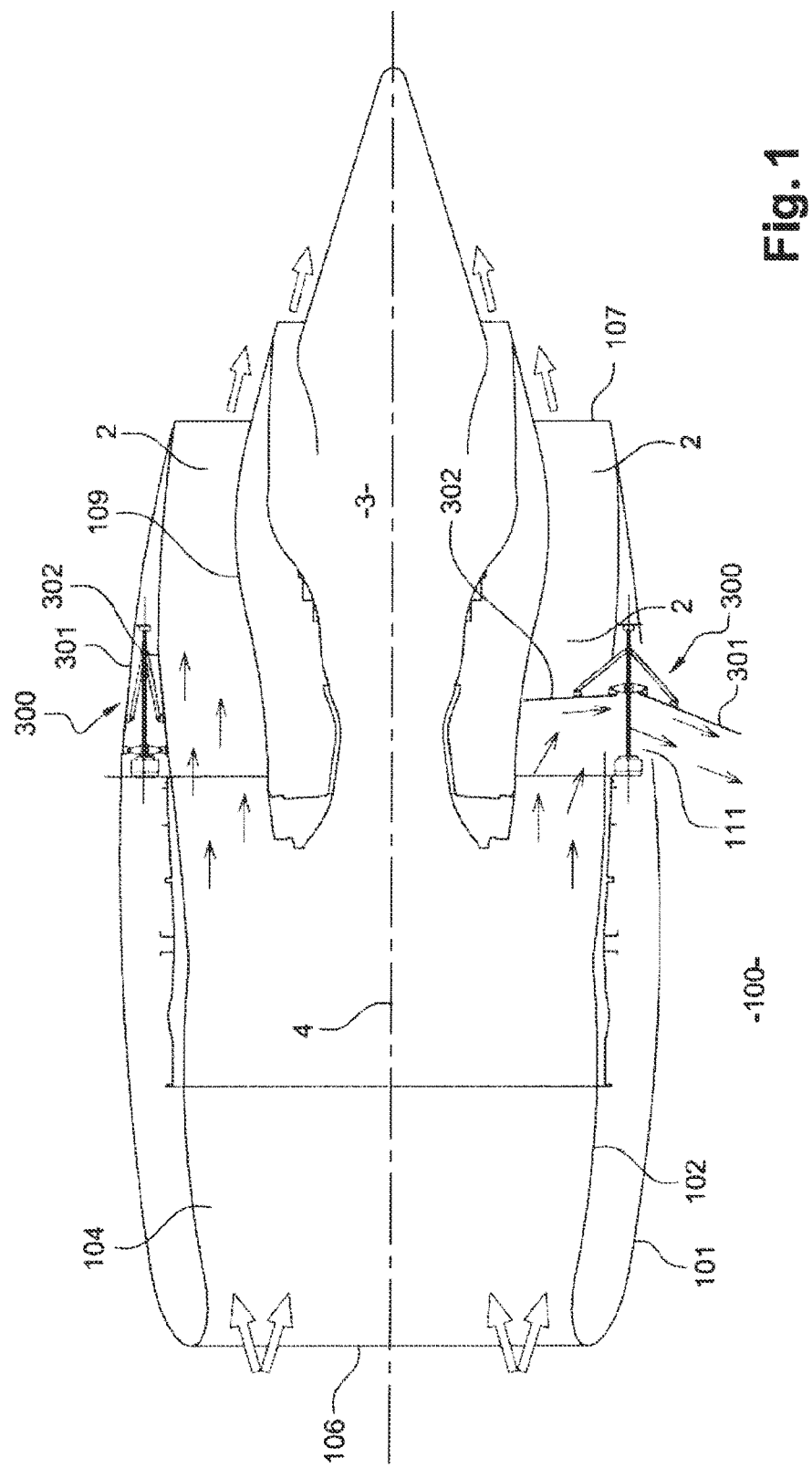
FIG. 1: a schematic representation in longitudinal cross section of a nacelle equipped with thrust reversers according to the disclosed embodiments, said reversers being shown in both the active position and the inactive position.

FIG. 1 shows a double-flow nacelle 100 equipped with two diametrically opposed reversers pursuant to an example of an embodiment. For example, an aircraft may be equipped with two nacelles 100, with each nacelle 100 being integral with the lower surface of a wing of said aircraft.

The nacelle 100 is equipped with an external cowling 101 and a superposed internal cowling 102, with the external cowling 101 covering the internal cowling 102. An engine 3 is arranged in an internal volume 104 of the cowling 102.

The thrust reversers 300 are made on the external 101 and internal 102 cowlings of the nacelle. In FIG. 1, the reversers are shown in both the inactive position and the active position on the nacelle, to illustrate the two possible positions of the reverser. Of course, in the normal operation of the nacelle, when the nacelle is in direct thrust or in reversed thrust, the two positions of the doors cannot coexist; the thrust reversers are either in the closed position or in the open position. Each thrust reverser 300 has two doors, an external door 301 and an internal door 302. The external door 301 is made within the thickness of the external cowling 101. The internal door 302 is made within the thickness of the internal cowling 102. The external and internal doors 301 and 302 of the same thrust reverser 300 are located in the same area of the nacelle. The same area of the nacelle means that the internal door 302 and the external door 301 of a thrust reverser 300 are superposed.

Air penetrates through a forward extremity 106 of the nacelle 100 and leaves the nacelle 100 through a rear extremity 107 of said nacelle opposite the forward extremity 106. A portion of the entering air forms a primary flow of air passing through the engine 3 before being ejected out of the nacelle 100. Another portion of the entering air forms a secondary flow of air. This secondary flow passes into an air passage channel 2 before being ejected out of the nacelle 100. This air passage channel 2 is arranged between an external wall 109 of the engine and an internal wall 102 of the internal cowling.

In the case in which the thrust reverser is in the inactive position, the secondary flow is evacuated through the rear extremity 107 of the nacelle 100. The doors are closed, and they extend in the extension of the external cowling 101 and of the internal cowling 102 in which they are arranged respectively, so as to form an aerodynamic continuity with the external wall and the internal wall of said cowlings.

In the case in which the thrust reverser is in the active position, the doors are open simultaneously, so that said internal and external doors extend toward the inside and toward the outside, respectively, of the nacelle. Thus the displacements to open the internal door 302 and external door 301 of a thrust reverser 300 are in opposite directions. The internal door 302, when it is open, has a free extremity 14 directed toward the external wall 109 of the engine 3. By free extremity of the door is meant the extremity opposite the hinged extremity of said door. The opening of the internal door 302 then obstructs the air passage channel 2 through which the secondary air flow is passing. This flow can no longer be directed toward the rear extremity 107 of the nacelle 100 to be ejected outside the nacelle.

The free extremity of the external door 301 is pointed toward the exterior of the nacelle 100, thus revealing an opening 111 through which the secondary flow is expelled. In addition, the external door 301 extends in a direction essentially perpendicular to a longitudinal axis 4 of the nacelle 11. The external door thus deflects the secondary flow to leave toward the front 106 of the nacelle, thus generating a thrust reversal.

Figure 2:
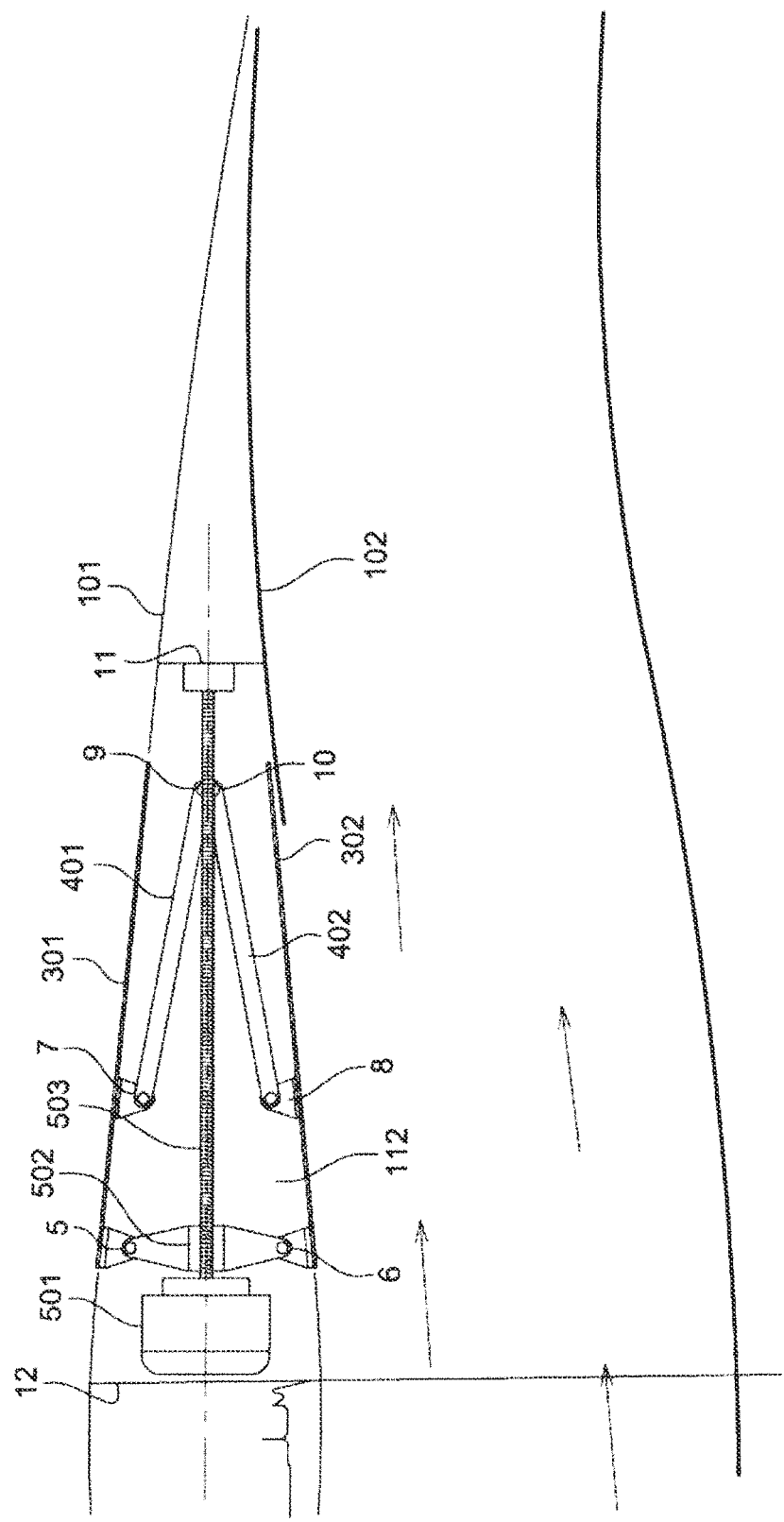
FIG. 2: a more detailed representation in longitudinal cross section of 1 reverser from FIG. 1 in the inactive position.
Figure 3:
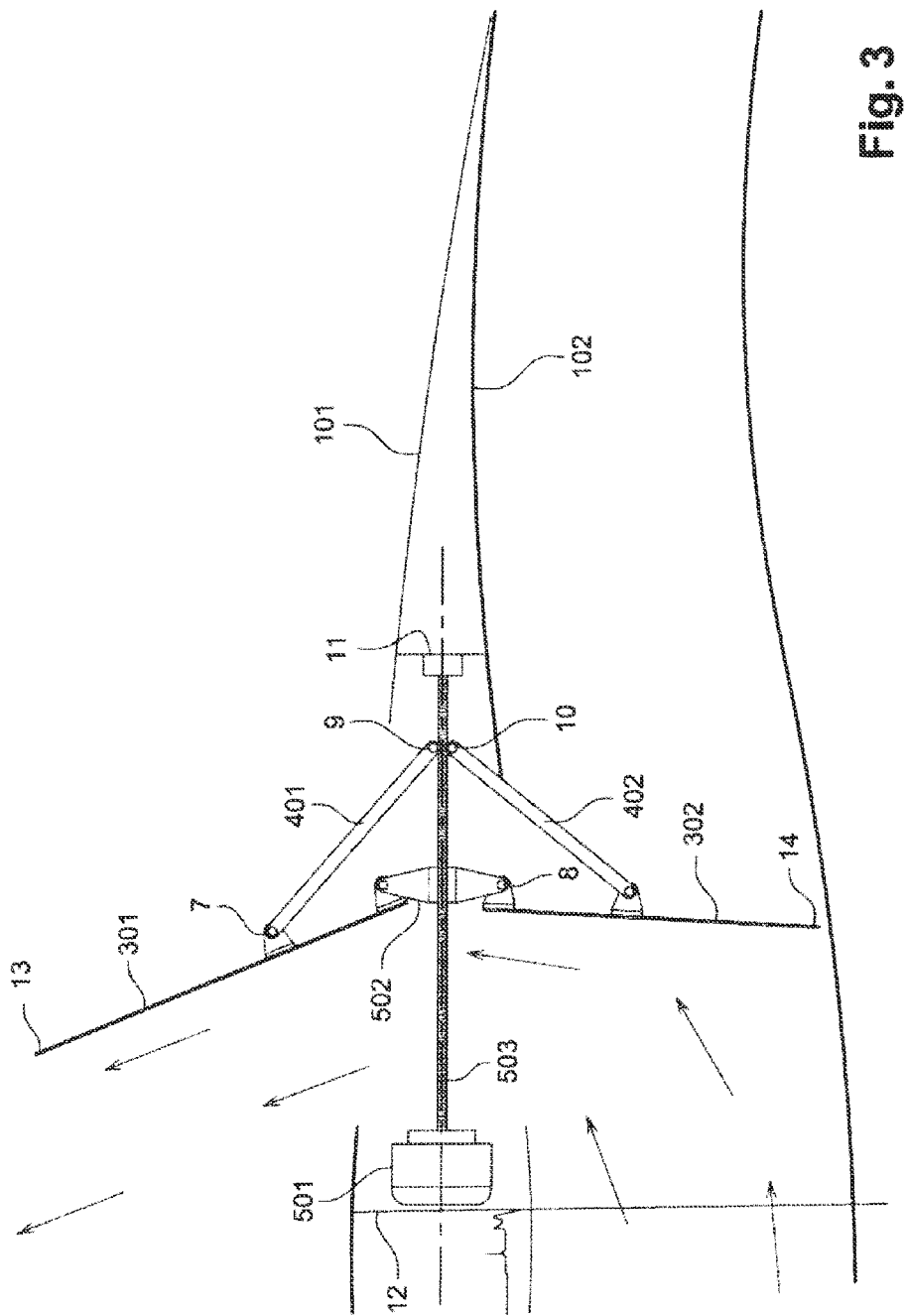
FIG. 3: a more detailed representation in longitudinal cross section of the reverser in the active position.

FIGS. 2 and 3 show in further detail a thrust reverser pursuant to an embodiment showing it in the inactive position and the active position, respectively.

The thrust reverser also has means for displacement providing for the simultaneous displacement of the external and internal doors of the same reverser, between a first inactive position in which said doors are integrated in the cowling, and a second active position in which said doors are open so that said internal and external doors extend toward the inside and toward the outside of the nacelle, respectively.

This means of displacement is composed of a smaller number of movable elements than in the known reversers, thus providing for kinematics that are simple to put into action.

In order not to perturb the aerodynamic profile of the nacelle, and more precisely the flowing of the secondary and external flow around the wall of the cowling, the movable elements are arranged so that when the external and internal doors are in the inactive position, they are lodged in a compartment 112 formed by the external door 301 and the internal door 302.

In a particularly advantageous way, when the doors are open, these elements are arranged relative to the doors so that they are no longer in the path of the deflected secondary flow, so as not to perturb the flowing of the secondary flow during the reversed-thrust phase.

Each of the doors has a free extremity 13, 14 and an opposite extremity 5, 6 that are linked to pivot on a nut 502. The free extremity of the door means the extremity opposite the hinged extremity of said door. Said reversible ball nut 502 is mounted on an endless screw 503 that has a longitudinal axis essentially parallel to the principal axis of the nacelle 4. Said nut is designed to slide along the screw 503.

The external door 301 and internal door 302, respectively, are each linked to the screw 503 through two intermediate arm assemblies 401, 402. Each assembly has at least two arms. The extremities 7, 9 of the arms are hinged, respectively, to the door and to the shaft 503 so that the sliding of the nut along the screw entails the displacement of the doors 301, 302 between the inactive position in which they are closed and the active position in which they are open. Said arms typically are hinged connecting rods.

The screw 503 has a first extremity linked to a fixed structural element 11 of the nacelle located on the downstream side of said nacelle and a second extremity linked to another fixed structural element 12 of the nacelle located on the upstream side of said nacelle.

In the inactive position of the thrust reverser 300, the nut is in a position located on the upstream side of the screw 503, and the external doors 301 and 302 [sic] extend in the extension of the external cowling 101 and the internal cowling 102. When it is desired to move the thrust reverser 300 into the active position, the displacement of the nut is brought about by means of a motor 501. The displacement of the nut toward the downstream side of the screw drives the pivoting extremities of the doors toward the interior of the compartment 112. The arms 401, 402 are hinged on the screw and the external door 301 and the internal door 320, pushing the doors toward the exterior of the nacelle. The external door 301 and the internal door 302 pivot at the location of the pivot 7, 8, so that the external door 301 is then opened toward the exterior of the nacelle and the internal door 302 is opened toward the air passage channel 2.

Thus, to go from the inactive position to the active position, the free extremities of the doors have described an arc in the direction from the rear of the nacelle toward the front of the nacelle. The dimension of the door and the distance of displacement of the nut along the screw are designed so that the internal door extends toward the interior of the nacelle in a direction essentially perpendicular to the axis 4 of the nacelle, to obstruct the air passage 2.

When the thrust reverser 300 returns to the inactive position, the nut returns to its initial position, guiding the doors 301, 302 into the closed position by the intermediation of the pivots.

Figure 4:
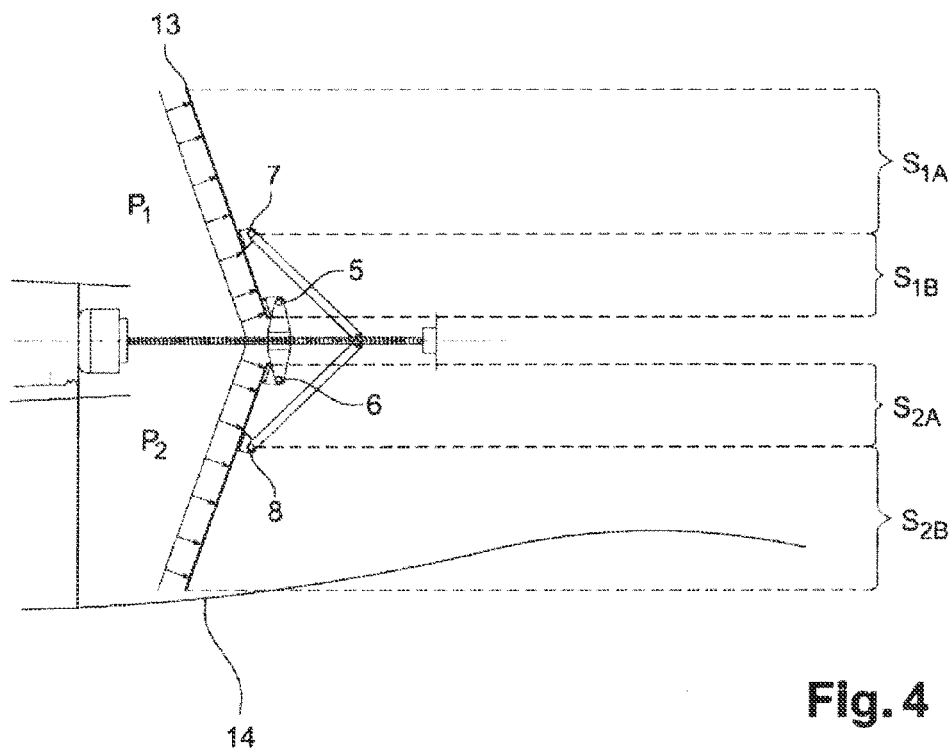
FIG. 4: an illustration of the forces generated by the external flow and the secondary flow, respectively, on the external door and on the internal door of the thrust reverser.

As shown in FIG. 4, the thrust reverser pursuant to the disclosed embodiments is equipped with means for automatic closure of the external door 301 and the internal door 302 so as to maintain the doors in the closed position, which becomes a stable position.

The external door 301 is composed of two surfaces $S_{1A}$ and $S_{1B}$, and the internal door 302 is also composed of two surfaces $S_{2A}$ and $S_{2B}$. The surfaces $S_{1A}$ and $S_{2A}$ are delimited respectively by the free extremities 13, 14 of the external door 301 and the internal door 302, and the pivot linkages 7, 8 of said doors with the extremities of the arms 401, 402. And the surfaces $S_{1B}$ and $S_{2B}$ are delimited respectively by the pivot linkages 7, 8 of said doors and the pivot linkages 5, 6 of said doors with the extremities of the nut 502.

The dimensions of these surfaces are such that the forces generated by the pressure P1 of the external flow applied to the surface $S_{1A}$ of the external door 301 and by the pressure P2 of the secondary flow applied to the surface $S_{2A}$ of the internal door 302 are greater than the pressure forces of the external flow on the surface $S_{1B}$ and of the secondary flow $S_{2B}$ [sic], with the resultant of the forces exerted on the doors then being in a direction tending to maintain the doors in the stable closed position. In this way, these means of automatic closure based solely on the utilization of the pressures provide a guarantee that no untimely opening of the doors 301, 302 can be produced when the aircraft is in flight.

In addition, these means provide for avoiding the provision of a locking mechanism for the reverser that necessitates supplementary elements and supplementary manufacturing steps.

Figure 5:
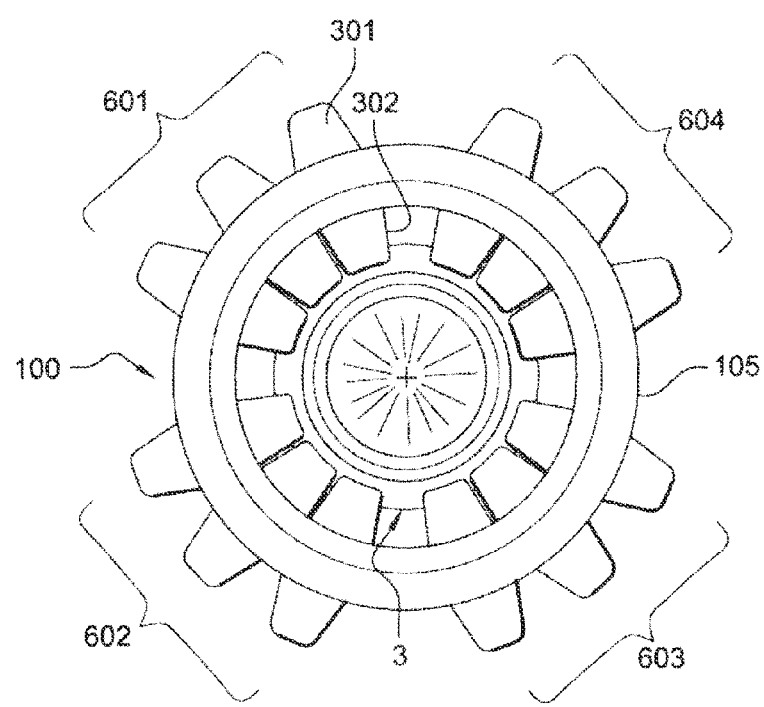
FIG. 5: a schematic representation of the nacelle viewed from the front equipped with four groups of three thrust reversers pursuant to the disclosed embodiments in the open position.

FIG. 5 shows an example of embodiment of a nacelle 100 for a double-flow engine intended to be installed on an aircraft equipped with reversers. In FIG. 5, the nacelle has four groups 601, 602, 603, 604 of three reversers each, arranged around an external circumference 105 of the nacelle.

In another example of embodiment of a nacelle 100 for aircraft, the thrust reversers are distributed at a regular interval around the circumference. Depending on the spacing between two adjacent doors, the number of thrust inverters per nacelle can be varied. In particular, if the number of thrust reversers is increased, the surface area of each door can be reduced, and the risks of deformation of said doors can be limited.

Of course the nacelle can be equipped with different types of thrust reversers. For example it is equipped with a thrust reverser 300 according to the disclosed embodiments and a thrust reverser pursuant to the prior art.

In the same way, it is possible to equip an aircraft with one nacelle of the disclosed embodiments and one nacelle equipped with thrust reversers of the prior art.

The invention claimed is:

1. A thrust reverser for double-flow nacelle that has a cowling, with said thrust reverser having an internal door and an external door designed to be made within the thickness of said cowling, and means for simultaneously displacing said doors between a first position called the rest position, in which said doors are integrated into said cowling so as to form an aerodynamic continuity with the external wall and the internal wall of said cowling, and a second active position, in which said doors are open so that said internal and external doors extend toward the inside and toward the outside of the nacelle, respectively, thus at least partially blocking the annular channel of the secondary flow, to deflect the secondary flow and to generate a thrust reversal, wherein said means of displacement of said doors comprise means for sliding along a shaft essentially parallel to the principal axis of the nacelle, with the extremities of said means being designed to be linked to pivot at one extremity of said doors, with each of the doors being linked also to said shaft through at least two intermediate pivoting arms whose extremities are hinged respectively to the door and to the shaft so that the sliding of said means along said shaft causes the displacement of the doors between the two positions, and in that said means of displacement are arranged relative to the doors so that they are made to be received in a compartment in said cowling formed by the doors in the rest position.

2. The thrust reverser pursuant to claim 1, wherein the external door and the internal door have dimensions such that the forces generated by the pressure P1 of the external flow applied to a surface $S_{1A}$ of the external door and by the pressure P2 of the secondary flow applied to a surface $S_{2A}$ of the internal door lead to the exertion of forces on the doors in a direction tending to maintain the doors in the rest position, which becomes a stable position, with said surfaces $S_{1A}$ and $S_{2A}$ being delimited respectively by the free of the external door and of the internal door and the pivot linkages of said doors with the extremities of the arms.

3. The thrust reverser pursuant to claim 1, wherein said means of sliding have a reversible ball nut held on an endless screw, said nut being designed to be displaced longitudinally along said screw between a position located on the upstream side of said screw in which the doors are in the rest position, and a position located on the downstream side of said screw in which the doors are in the deployed position, with the extremities of said nut being linked to pivot both at the extremity of the external door and at the extremity of the internal door.

4. The thrust reverser pursuant to claim 3, wherein the screw has a first extremity linked to a structural element of the nacelle located on the downstream side of said nacelle and a second extremity linked to a second structural element of the nacelle located on the upstream side of said nacelle.

5. The thrust reverser pursuant to claim 3, further comprising a motor designed to displace said nut along the screw.

6. The thrust reverser pursuant to claim 1, wherein said pivoting arms are connecting rods.

7. A nacelle for double-flow engine comprising a cowling, an engine mounted inside an internal volume of the cowling, and an annular channel for the flow of a secondary flow arranged between the engine and the cowling, with said nacelle being equipped with at least one thrust reverser pursuant to claim 1 to form a reversed flow from said secondary flow.

8. The nacelle pursuant to claim 7, wherein said thrust reversers are arranged in said cowling by being arranged around an external circumference of said cowling.

9. The nacelle pursuant to claim 8, further comprising four groups of three thrust reversers each arranged around said circumference, with said groups being diametrically opposed in pairs.

10. An aircraft equipped with at least one nacelle pursuant to claim 7.

* * * * *